US012734842B2

(12) United States Patent
Iagher et al.

(10) Patent No.: US 12,734,842 B2
(45) Date of Patent: Sep. 15, 2026

(54) DIGITAL FLOCKING PROCESS

(71) Applicant: Kornit Digital Ltd., Rosh HaAyin (IL)

(72) Inventors: Lior Iagher, Ramat Gan (IL); Lavit Feldman, ShaAr Effraim (IL); Dor Weinberger, Herut (IL); Ilan Shmuel Mano, Ramat-Gan (IL); Allon Shimoni, Modiin-Maccabim-Reut (IL)

(73) Assignee: Kornit Digital Ltd., Rosh HaAyin (IL)

(*) Notice: Subject to any disclaimer, the term of this patent is extended or adjusted under 35 U.S.C. 154(b) by 0 days.

(21) Appl. No.: 19/117,979

(22) PCT Filed: Aug. 9, 2023

(86) PCT No.: PCT/IL2023/050831
§ 371 (c)(1),
(2) Date: Apr. 3, 2025

(87) PCT Pub. No.: WO2024/075106
PCT Pub. Date: Apr. 11, 2024

(65) Prior Publication Data

US 2026/0008289 A1 Jan. 8, 2026

Related U.S. Application Data

(60) Provisional application No. 63/412,599, filed on Oct. 3, 2022.

(51) Int. Cl.
*B41M 7/00* (2006.01)
*B41M 3/00* (2006.01)
(Continued)

(52) U.S. Cl.
CPC ............ *B41M 7/009* (2013.01); *B41M 3/006* (2013.01); *B41M 3/008* (2013.01); *D06P 5/2077* (2013.01);
(Continued)

(58) Field of Classification Search
CPC ...... B41M 7/009; B41M 3/006; B41M 3/008; D06P 5/2077; D06P 5/30
See application file for complete search history.

(56) References Cited

U.S. PATENT DOCUMENTS 1,731,660 A 10/1929 Harris
2006/0234575 A1 10/2006 Salitsky et al.
(Continued)

FOREIGN PATENT DOCUMENTS

DE 102007035406 B3 * 1/2009 ............ B41M 3/006
GB 1349555 4/1974
(Continued)

OTHER PUBLICATIONS

Machine translation of DE 102007035406 B3 (Year: 2026).*
(Continued)

*Primary Examiner* — Stephen D Meier
*Assistant Examiner* — Thomas Ray Knief

(57) ABSTRACT

The instant disclosure provides a process for forming an image in flock, which involves digitally printing an adhesive composition directly on a substrate surface, preferably by modifying the amount of the adhesive based on a linearization curve, flocking the surface with a flock material, and curing the image. The instant disclosure also provides a method for obtaining a linearization curve for digital flocking, which involves forming a pattern using an adhesive composition, flocking the pattern with a flock material, curing the flocked image to obtain a flocked greyscale image, and measuring the flock intensity to obtain the linearization curve, whereas the linearization curve is unique for a set of given conditions and can be implemented in RIP commands to modify DPI values for digital flocking. An image comprising regions with more than one flock intensity is also described.

11 Claims, 5 Drawing Sheets

(51) Int. Cl.

| | |
|---|---|
| ***D06P 5/20*** | (2006.01) |
| ***D06P 5/30*** | (2006.01) |
| ***G06K 15/02*** | (2006.01) |

(52) U.S. Cl.

CPC ............ *D06P 5/30* (2013.01); *G06K 15/1872* (2013.01); *G06K 2215/0094* (2013.01); *G06K 2215/101* (2013.01)

(56) References Cited

U.S. PATENT DOCUMENTS

| | | | |
|---|---|---|---|
| 2008/0095973 A1 | 4/2008 | Abrams | |
| 2008/0302772 A1 | 12/2008 | Lion | |
| 2011/0223373 A1 | 9/2011 | Abrams | |
| 2012/0015156 A1 | 1/2012 | Abrams | |
| 2012/0156427 A1 | 6/2012 | Giloh et al. | |
| 2013/0160193 A1 | 6/2013 | Cremin | |
| 2016/0046843 A1 | 2/2016 | Geddes et al. | |
| 2016/0059622 A1 | 3/2016 | Orcutt | |
| 2016/0159998 A1 | 6/2016 | Spencer et al. | |
| 2016/0280002 A1* | 9/2016 | Ohnishi | B44C 1/00 |
| 2017/0120554 A1 | 5/2017 | Giloh et al. | |
| 2017/0355168 A1 | 12/2017 | Giloh et al. | |

FOREIGN PATENT DOCUMENTS

| | | |
|---|---|---|
| JP | 11138672 | 5/1999 |
| WO | WO 2006/092666 | 9/2006 |
| WO | WO 2009/118654 | 10/2009 |
| WO | WO 2017/212337 | 12/2017 |
| WO | WO 2024/075106 | 4/2024 |

OTHER PUBLICATIONS

International Search Report and the Written Opinion Dated Oct. 24, 2023 From the International Searching Authority Re. Application No. PCT/IL2023/050831 (9 Pages).

International Search Report and the Written Opinion Dated Nov. 27, 2023 From the International Searching Authority Re. Application No. PCT/IL2023/051034 (13 Pages).

International Preliminary Report on Patentability Dated Apr. 17, 2025 From the International Bureau of WIPO Re. Application No. PCT/IL2023/050831 (7 Pages).

International Preliminary Report on Patentability Dated Apr. 17, 2025 From the International Bureau of WIPO Re. Application No. PCT/IL2023/051034 (9 Pages).

Supplementary European Search Report and the European Search Opinion Dated Feb. 10, 2026 From the European Patent Office Re. Application No. 23874426.2. (9 Pages).

* cited by examiner

DIGITAL FLOCKING PROCESS

RELATED APPLICATIONS

This application is a National Phase of PCT Patent Application No. PCT/IL2023/050831 having International filing date of Aug. 9, 2023, which claims the benefit of priority under 35 USC § 119 (e) of U.S. Provisional Patent Application No. 63/412,599 filed on Oct. 3, 2022. The contents of the above applications are all incorporated by reference as if fully set forth herein in their entirety.

FIELD AND BACKGROUND OF THE INVENTION

The present invention, in some embodiments thereof, relates to digital printing and more particularly, but not exclusively, to a method of digitally forming an image using intensity-tunable or density-modulated flocking.

Flocking is the process of depositing many small fiber particles (called flock) onto a surface. It can also refer to the texture produced by the process, or to any material used primarily for its flocked surface. Flocking is used in many ways to give a surface a texture like velvet, velveteen, or velour, such as t-shirts, wallpaper, gift/jewelry boxes, and upholstery. Besides the application of velvety coatings to surfaces and objects, flocking in fabrics is a method of creating another surface.

During flocking, fibers or a layer of flocks are deposited over a substrate and affixed to the surface of the substrate with an adhesive, which is applied over the entire or over specific area(s) of the surface. In most cases, the fibers are attached to the adhesive by the well-known methods: transfer from flocking paper by heat press, application of a high-voltage electric field, or even by simply pouring the fibers on top of the adhesive layer.

In current standard implementations, the adhesive is applied on the surface by spreading it with simple mechanical means, such as roller, brush, pad, spray, etc.; in the screen-printing industry the adhesive layer can be applied by a mesh, as an additional layer on the surface; another, more flexible method is based on glue-sheets, where the desired image is first created on a sheet covered with glue, then transferred to the substrate by heat press, and finally the flocks are applied only to the glued areas to create flocking of the image, or an image made of flock. In all these cases, the result is usually a single coated area; or in more complex applications, a few relatively large areas, with an inaccurate and a single layer of the adhesive, and therefore, the resulting product is a single and uniform layer of flocks coating.

The current standard implementations are based on "analog" and rough application of the adhesive that attaches the flocks to the surface. The resulting pattern or image is therefore inaccurate, and has the same flocking characteristics all over its flocked area(s)—including color or shade, hand-feel, appearance, density, etc., and in addition, the processes are not suitable for mass production since they involve complex and manual operations with multiple stages.

CN105583132B provides a kind of method of digital flocking, wherein the key step is making a thermal transfer printing dedicated transfer paper.

CN110857537A provides a digital electrostatic flocking and printing process, which comprises the steps of laying a first substrate with a flocking surface; printing thermal sublimation ink on the flocking surface; carrying out hot-pressing compounding and sublimation color development on the flocking surface printed with the thermal sublimation ink; and finishing printing to obtain a finished product.

KR101231154B1 provides a process that comprises the steps of: (a) supplying a flocking fabric, which is piled by flocking yarn (flocking) on the surface of the fabric to a rotary screen printer; (b) stamping the coloring composition with a rotary screen printer to have a predetermined pattern on the surface of the flocking fabric; (c) drying the inlaid flocked fabric at a temperature of 70-150° C.; (d) treating the dried flocking fabric with steam at 110 to 180° C. to heat the colored composition to adhere to the fabric; and (e) washing and drying the heated flocking fabric with water at 20-70° C. to provide a printing method of the flocking fabric.

SUMMARY OF THE INVENTION

The present invention provides a process for using flocks as a colorant in a digital inkjet printing setup, wherein the digitation applies to the location, resolution, density and amount of the adhesive composition used to tether the flocks to the substrate. The accuracy and control over the printed adhesive composition equals that of any inkjet ink, and expresses itself in the intensity of the flocking. The result is an image having a range of flocking intensities, as a monochromatic greyscale image. The present disclosure also provides processes wherein more than one flocking substance is used, as well as colored ink compositions, all combined to afford colorful, high-resolution flocked image on a substrate.

Thus, according to an aspect of some embodiments of the present invention, there is provided a process of forming an image in flock, which is effected by:

- digitally printing a first adhesive composition directly on a surface of a substrate at a range of DPI values according to a first set of raster image processor (RIP) commands;
- flocking the surface using a first flock material; and
- curing the image.

In some embodiment, the process further includes, prior to the flocking, pre-curing (partially drying) the adhesive composition.

In some embodiment, the process further includes, prior to the curing, digitally printing the first adhesive composition or a second adhesive composition directly on a surface of a substrate at a range of DPI values according to the first set of RIP commands or a second set of RIP commands, and flocking the surface using the first flock material and/or a second flock material, the second adhesive composition is different than the first adhesive composition, the second set of RIP commands is different than the first set of RIP commands, and the second flock material is different than the first flock material.

In some embodiment, the process further includes digitally printing a colored ink composition prior subsequent to any one of the digitally printing a first adhesive composition and/or the flocking the surface using a first flock material.

In some embodiment, the process further includes, prior to the digitally printing, obtaining a linearization curve, and implementing the linearization curve to the RIP commands According to another aspect of some embodiments of the present invention, there is provided a method for obtaining a linearization curve for digital flocking, which is carried out by:

- forming a pattern using a given adhesive composition on a given substrate by a given printing machine, the pattern is afforded by digitally printing the adhesive composition in a gradient of original DPI values ranging from no surface coverage to maximal surface coverage;

flocking the pattern with a given flock material by a given flocking;

curing the flocked image using given curing conditions method to thereby obtain a flocked greyscale image; and measuring a flock intensity of the flocked greyscale image at a plurality of positions along the greyscale, thereby obtaining the linearization curve that correlates a DPI value on a range of DPI values to a flock intensity value on a range of flock intensity values.

In some embodiment, the linearization curve is unique for a set of the given adhesive composition, the given printing machine, the given flock material, the given flocking method, and the given curing conditions.

In some embodiment, the linearization curve is implemented in a set of RIP commands to modify the original DPI values, thereby obtaining modified DPI values for a digital flocking process.

According to another aspect of some embodiments of the present invention, there is provided an image that is characterized by regions, wherein the regions are characterized by more than one flock intensity.

In some embodiment, the image is characterized by a range of flock intensities and/or a range of flock quantity.

In some embodiment, the image is afforded by the process provided herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying figures. With specific reference now to the figures in detail, it is stressed that the particulars shown are by way of example and for purposes of illustrative discussion of embodiments of the invention. In this regard, the description taken with the figures makes apparent to those skilled in the art how embodiments of the invention may be practiced.

In the figures:

FIG. 1B presents a simplified exemplary linearization procedure protocol, which can be carried out for any given set of flocking conditions, according to embodiments of the present invention;

DESCRIPTION OF SOME SPECIFIC EMBODIMENTS OF THE INVENTION

Figures 1A, 1B:
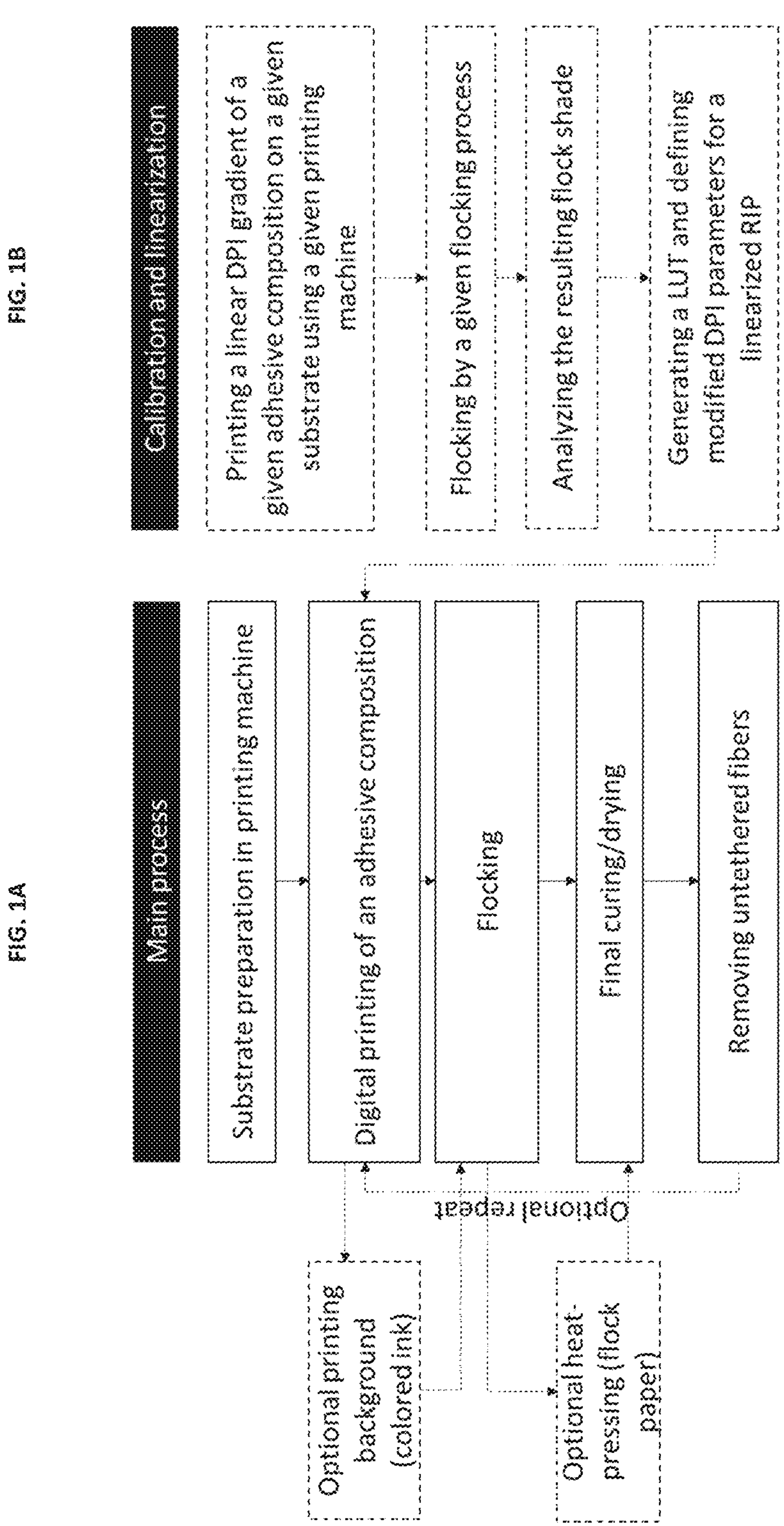
FIGS. 1A-B present a flowchart of the process provided herein, wherein FIG. 1A an exemplary basic process for forming an image with various flock shades.

The present invention, in some embodiments thereof, relates to digital printing and more particularly, but not exclusively, to a method of digitally forming an image using intensity tunable flocking.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As presented hereinabove, present days flocking is mostly effected by analog processes, and product a binary result, namely a pattern of flocked or unflocked regions, or a silhouette of an image. While conceiving the present invention, the inventors have contemplated harnessing the power of digital printing to flocking, and in particular, harnessing the accuracy, controllability and speed of digital printing to at least apply the adhesive layer on the substrate prior to flocking.

While reducing the present invention to practice, it was surprisingly found that digital methodology can be used not only to apply the adhesive more accurately and rapidly, but also to modulate the density of the flocks on the substrate, thereby achieving an image with variable flocking intensities against the background color of the substrate, and/or a printed background color. The grade of flock shades was achieved by digitally applying the adhesive on the substrate according to a digital rendering of the image, wherein high adhesive printing density afforded a darker shade (and more velvety hand feel) and a low adhesive printing density afforded a lighter shade (and less velvety hand feel).

Hence, the present invention provide a process for printing images having a range of shades of flocking of one or more type of flocking fibers versus the substrate color. In some embodiments, this is achieved by using black flocking fibers on a white substrate affording a greyscale image, ranging from black (dense flocking) to white (no flocking), afforded by digitally printing a range of adhesive ink resolution/density.

A Digital Flocking Process:

The process provided herein is a digital flocking process. As known in the art of digital printing, spatial and planar printing at various resolutions and/or intensities, typically referred to in terms of Dots Per Inch or DPI (the number of printed dots contained within one inch of an image printed by a printer), and/or printing droplets of various sizes, and/or printing droplets at various density (surface coverage), and/or printing droplets in various thicknesses (number of layers), and/or printing multiple (two or more) compositions of fluids from different printheads simultaneously.

The terms "resolution", "density" and "amount/thickness" are to be interpreted as a broad and general terms, all of which are encompassed under the meaning of the term "DPI", as used herein. Each dot/pixel and/or area can be printed on using drops of different volumes, different spatial spread (density), and different amount of ink stemming from the number of drops laid on the same dot/pixel and/or area (more than one layer).

In the context of the present invention, a digitally inkjet-printable adhesive composition is ejected from one or more printheads onto the surface of the substrate in a manner similar to that of digitally printing a colored ink, and while following the digital instructions (commands) stemming from the raster image processor (RIP), the adhesive composition is applied on the surface at variable density at any resolution, depending on the image and the hardware. The resulting adhesive layer is thereafter contacted with flock using any known flocking method (transfer media/paper, electrostatic, etc.), thereby forming the image comprising more than one flocking intensity. In the context of the present invention, "flocking intensity" refers to the density of flock fibers tethered to the substrate, which is a direct result of the DPI value (density/resolution/amount) of the adhesive composition at any region of the image. The flocking intensity can be measured by color intensity measurements (e.g., L values), however, other parameters can be used to evaluate flocking intensity, such as hand-feel.

Additionally, the inkjet technology can be used to apply the adhesive layer accurately to create the required attribute on the substrate by controlling the resolution/density of various areas, the number of layers, the adhesive materials, or any other characteristic, including background color.

Thus, according to some aspects of the present disclosure, there is provided a process of tunable and controlled flocking, carried out as follows:

1. Inserting the substrate (made of any compatible material) to the printing system, and optionally cleaning, smoothing and preparing the substrate surface.
2. Digitally applying (printing) layer(s) of a colored or transparent adhesive composition (as an ink) over the desired areas to create the end product characteristics.

The higher the resolution/density of the adhesive, the higher the density of the flocking, and the product is more velvet-like and more opaque. By accurately controlling the adhesive layer(s), the resulting flocking can be tuned to any desired value between 0% (no flocking, full visibility of the substrate or the background color printed on the substrate, and the hand-feel of the original or printed substrate) and 100% (full cover and visibility of the flocks). Note: the digital application of the adhesive layer is a key feature of the present invention.

The thickness of the adhesive layer can be adjusted in accordance with the flocking fibers: the longer the compatible fibers of the flocking—the thicker the layer of the adhesive; for example, 0.5 mm fibers require adhesive thickness of 50 micron over the substrate. The longer the fibers are, the product is more velvety with smoother hand feel.

The process may further include an optional pre-curing of the printed adhesive to get a desired mechanical properties of the ink in order to improve the flocking process, particularly in cases where some of the liquids should be dried to some extent prior to applying the flock fibers.

3. Applying flocks by a flocking process primarily or at least on the adhesive-printed regions of the substrate, optionally followed by cleaning the excess fibers.
4. Drying and curing the flocked substrate to tether the flocks by means of the adhesive to the substrate and affording the image.
5. Cleaning the substrate from untethered flock fibers and obtaining a finished product; the flocks will remain only at the areas covered with the adhesive composition, glued to the adhesive layer proportional to the layer's DPI.

Optionally the flocking process involves using flock paper, in which case the process includes heat-pressing the flocked image to insert the flocks to the adhesive layer, and releasing the flocking paper thereafter.

For additional flocking colors and patterns, the process may further include an optional repetition of steps 2-5 using additional flock colors and/or flock types and/or adhesive (ink) composition and varied in color and/or composition.

The substrate can be released from the printing machine after the (one or more) flocking step.

FIG. 1A presents an exemplary basic process for forming an image with various flock shades.

Adhesive Composition:

The adhesive composition, applied as, and therefore referred to herein as an ink composition, may be any sort of clear or colored digital ink composition containing a binder. For example, any pigment-based digital ink composition is suitable for use as a flock adhesive, since such inks contain an adhesive/binder element to fix the pigment particles to the substrate.

Also useful in the context of an adhesive composition, according to some embodiments of the present invention, are two-part ink compositions where an immobilizing composition is applied on the substrate, followed by a binder-containing composition that coagulates upon contacting the immobilizing composition. The coagulation limits and/or arrests wicking, soaking and spreading of the ink droplets when printed on absorptive substrates. Two-part ink compositions are disclosed, for example, in U.S. Pat. Nos. 9,725,848, 9,616,683, 10,472,533, 10,858,528, and 11,098,214, which are incorporated herein by reference. For example, the Kornit's Neopigment™ family of two-parts inks. The same principle of limiting wicking, soaking and spreading of the inks is applied to the adhesive composition, limiting the wicking, soaking and spreading of the adhesive droplets when printed on absorptive substrates.

Another example for an adhesive composition may be Dupont Artistri® as well as any other commercial available ink comprising an adhesive/binder component. The inks may include any number of different binders, such as acrylates and derivatives thereof, polyurethanes and derivatives thereof, and any ink composition that can be used as adhesive for the flocking process.

Calibration and Linearization:

In some embodiments of the present invention, the digital flocking process provided herein is preceded by preparing and/or obtaining a linearization curve, and implementing this linearization curve to modify the DPI values of the RIP commands used by the printing machine. In general, a typical flocking process depends on several factors, including the type of flocks, the method used for depositing the flocks, and the ambient conditions (e.g., humidity). Due to these factors, and other factors stemming from using a digital printing machine and digital ink compositions, according to embodiments of the present invention, not only the resolution/density/thickness of the adhesive layer determines the shade of the flocked areas, meaning that the path from light (low flock coverage) to dark (high flocks coverage) may not be linearly proportional to the resolution/density/thickness of the adhesive layer(s).

To improve the controllability over the results of the tunable flocking process, according to embodiments of the present invention, the system may optionally undergo a linearization procedure prior to the image printing process in order to correct the non-linearity between the adhesive layer resolution/density/thickness and the flocking shades ("grey-scale"). In this linearization step, the entire range of flocking intensity is calibrated with a set of specific flocking conditions to form a correlation table or a look-up table (hereinafter "LUT") so any value of flocking intensity can be correlateds to a reproducible adhesive printing value (e.g., DPI, or resolution/density/thickness), and the system can create any desired shades more accurately and controllably based on the LUT.

In the context of the above, flocking conditions include the substrate parameters (type and color), flocking material parameters (type, length and color), adhesive composition parameters (chemical and physical/mechanical), printing machine parameters (printhead(s) type, number and relative positions), and curing/pressing parameters (type and temperature). Thus, the linearization procedure can, and in some embodiments must be effected for each substrate, each adhesive composition, each printing machine and each flocking material and/or flocking method.

FIG. 1B presents a simplified exemplary linearization procedure protocol, which can be carried out for any given set of flocking conditions, according to embodiments of the present invention.

Figure 2:
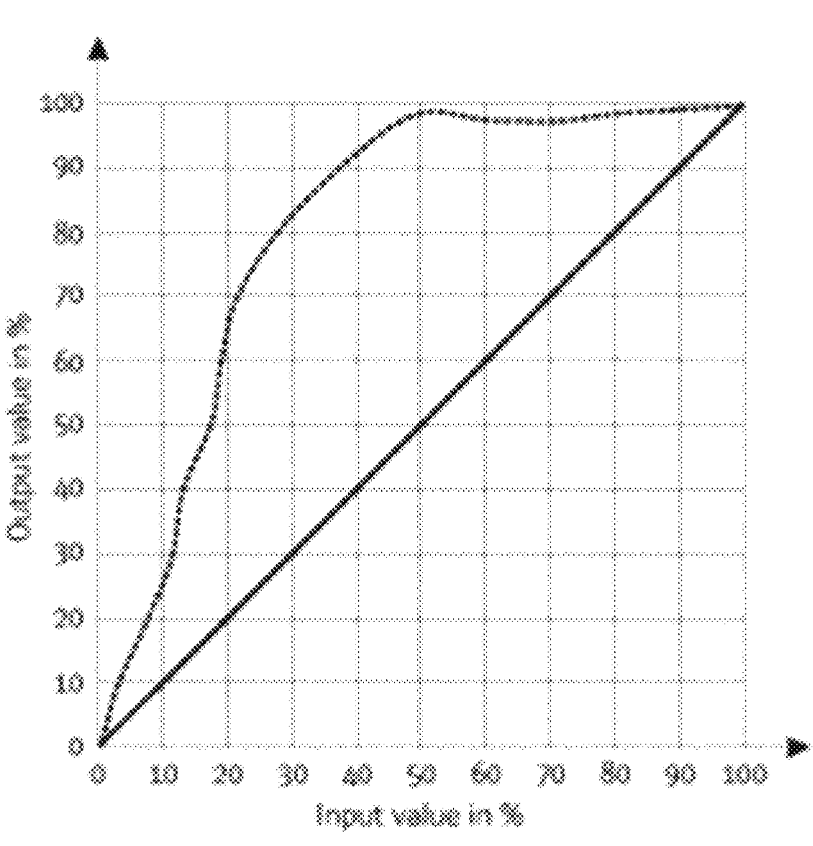
FIG. 2 presents an exemplary general linearization curve, wherein the solid line represents an ideal linear correlation between flock shade intensity (darkness/color) and DPI coverage (resolution/density/thickness), and the dotted line represents the actual shade of the flocked area (output) based on a un-corrected (linear) adhesive DPI gradient (input)

FIG. 2 presents an exemplary general linearization curve, wherein the solid line represents an ideal linear correlation between flock shade intensity (darkness/color) and DPI coverage (resolution/density/thickness), and the dotted line represents the actual shade of the flocked area (output) based on a un-corrected (linear) adhesive DPI gradient (input).

It is noted that in the context of calibration and linearization of flock intensity by modified DPI values, the color/shade intensity is not that of the adhesive/ink composition as printed on the substrate, but rather that of the flocking fiber deposited on the substrate thanks to the adhesive composition. It is further noted that using a colored adhesive (ink) composition may affect the measured color of the flocked substrate as well.

As can be seen in FIG. 2, the applied amount of adhesive laydown on the substrate (adhesive density grade; input), and the resulting color (flock shade grade; output) do not follow the ideal linear line, and the dotted curve represents the actual behaver of the system.

The linearization curve is used to calibrate the adhesive density to the flock shade, such that a more linear behavior is afforded. The result of the linearization and calibration procedure is implemented during the adhesive printing stage, wherein a correction factor (LUT) stemming from the linearization curve is applied to the DPI values of the RIP in order to adjust the amount (drop size; layers), density and resolution and position of the adhesive composition droplets jetted from the printhead to the substrate.

Figure 3:
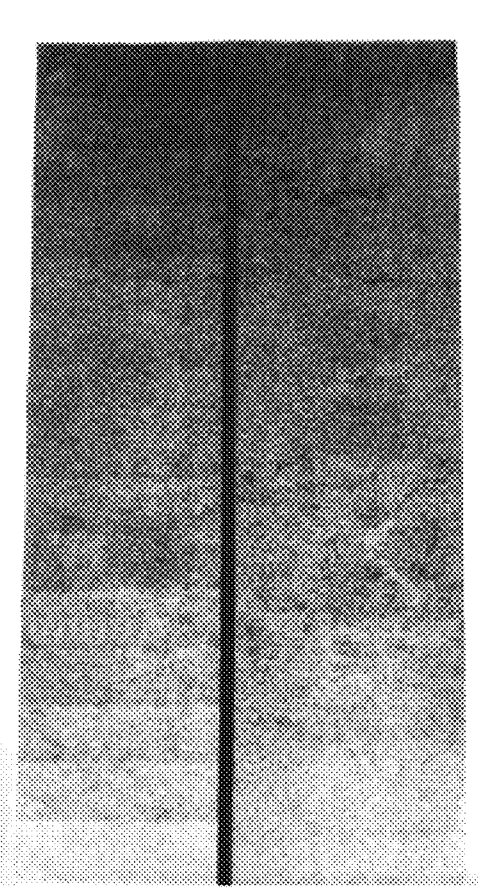
FIG. 3 presents a black-and-white photograph of a white fabric on which a linear gradient (in steps of 5% increase on the left and a continuous gradient on the right) of flocking shade was formed after a linearization and calibration procedure had been executed and implemented in the printing system.

FIG. 3 presents a black-and-white photograph of a white fabric on which a linear gradient (in steps of 5% increase on the left and a continuous gradient on the right) of flocking shade was formed after a linearization and calibration procedure had been executed and implemented in the printing system.

The linearization and calibration procedure is carried out experimentally, optionally for every set of digital flocking process variables that includes at least: any given printing machine (system), any given substrate, any given adhesive composition, and any given flocking material and flocking method. This set of process variables is referred to herein collectively as "flocking conditions", as all of these variables and factors contribute to the non-linearity of the flock shade versus adhesive density/resolution. Briefly, a given set of machine (e.g., a printer), substrate, adhesive and flock is used to form a calibration pattern, in which the adhesive is printed at a stepwise gradient of the adhesive density, controlled through the drop size and/or resolution/DPI equal values (e.g., 5% DPI increments from 0% to 100% coverage), and thereafter flocked. The resulting flocked pattern is analyzed for shade intensity (using, e.g., a color analyzer), and the deviation from linearity is calculated for each DPI (density) value to afford a linearization correction value associated with each DPI value. These linearization correction values, collectively referred to herein as the "flock shade linearization curve", or simply "linearization curve", are thereafter used to modify the DPI values in the RIP in terms of amount/density/resolution of the adhesive composition, namely a calibrated DPI value for each flock shade value.

In a similar manner it is possible to calibrate the color profiles of the flocking background with any printed background color. The resulting color that appears to the eye is a combination of the substrate's color, the printed background color and the flocking color and density. Therefore, the complete linearization process may include different color profiles, which finally gives a large color gamut of the final flock image: gradients of red, blue, green, etc., or any combination thereof. For example, if the adhesive layer is formed by an adhesive composition of a specific color over as a first layer of adhesive, then the overall look of the flocking shall be with shades of the first layer color (not the substrate's color) according to the image processing predetermined color profile.

Pre-Curing:

An optional pre-curing step, or partial drying of the freshly printed adhesive composition, may improve the flocking process, which can be expressed in the quality of the resulting flocking (e.g., in terms of hand-feel). Partial drying of the adhesive layer can be effected by the same mechanism that is used for the final curing of the image, which evaporates at least partially excess fluids prior to the flocking step. In addition, pre-curing can improve the mechanical and adhesion properties of the ink prior to the flocking step. The pre-curing step may be carried out, according to some embodiments of the present invention, by radiation (IR emitter) and/or by hot air at temperature of 80-140° C. for 0.1-5 minutes depending on the amount and type of the printed adhesive composition and the heating method.

Additional Flocking Layers:

The process presented herein is conducive with multi-flocking steps, namely the methodology that is based on applying the adhesive as an inkjet ink, optionally together with the pre-curing discussed hereinabove, allows the formation of an image from more than one flocking material in one continuous process.

Since digital printing of the adhesive composition is highly accurate (less than 100 micron resolution), and considering a pre-curing step to at least partially dry the adhesive of a first iteration of the process, it allows multiple flocking layers to be applied side-by-side or within each other. For example, after a first iteration of printing and flocking, the first flock layer may exhibit gaps as part of the image, meaning that there are un-flocked or partially flocked regions on the substrate. These regions can be printed and flocked in a second iteration of the process forming a second flocking layer by applying additional adhesive accurately in the gaps and add additional flocks fibers thereon.

It is noted that the process can be repeated with additional layers as much as desired, wherein each layer can be formed using different adhesive composition (e.g., different background color), different flocking densities/intensities, and different flock fiber colors. The final image will be a combination of several regions, each with different flocking attributes, such as shade, color, hand-feel, etc.

Final Curing:

Final curing of the printed and flocked substrate is required to cure all layers (adhesive, flocks, and background inks). The curing process evaporates excess fluids and in some embodiments also initiates the cross-linking process of the binder(s) to fix the pigments (if used) and the flock fibers to the substrate. Therefore, the curing method should correlate to the characteristics of the substrate and the ink composition(s) used in the process the curing system may be a hot air drier and/or a system with IR emitter(s).

For example, in the case of textile products, the curing is usually performed by laying the printed piece on a moving belt and conveying it through a heated chamber using moderate to low flow heated air ("dryer") for a few minutes, depending on the amount of fluids. A specific non-limiting example, a printed cotton shirt with a printed image and a layer of flocks formed thereon, according to some embodiments of the present invention, may require about 6-8 minutes at a temperature of 160° C., or 10-12 minutes at 110° C., depending on the inks used and the type of flock fibers and the heating method.

It is expected that during the life of a patent maturing from this application many relevant processes for inkjet printing of 3D objects will be developed and the scope thereof is intended to include all such new technologies a priori.

As used herein the term "about" refers to +/−10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance or a composition, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

When applied to an original property, or a desired property, or an afforded property of an object or a composition, the term "substantially maintaining", as used herein, means that the property has not change by more than 20%, 10% or more than 5% in the processed object or composition.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

Black and White Greyscale Flock Image on a White Fabric

As proof of concept of some aspects of the present disclosure, the following flocked image was printed as described below.

Materials and Methods

Printing Machine: Kornit Atlas Poly Max digital Direct to Garment (DTG) inkjet printer for textile;
Substrate: Satin cotton fabric;
Adhesive (ink) composition: Kornit's Neopigment™ Olympia white ink;
Resolution: 600×800 DPI;
Number of ink/adhesive printhead channels: 4;
Number of ink/adhesive layers: up to 3;
Immobilization type by inkjet: Kornit Q.fix poly
Immobilization amount: 100% max coverage;
Ink/adhesive drop volume: 60 pL;
Immobilization amount by spray: 25%;
Flock type: Flock sheets by "Eptainks" viscose 0.5 mm thickness black;
Press parameters: 160° C., 30 Sec, 50 psi;
Dryer: Chiossei e Cavazzuti (hot air conveyer) TP320;
Pre-cure: 2 min, 110° C.;
Final cure: 10 min, 110° C.
A greyscale image made of flocks was formed on the substrate as follows:

Stage 1—Linearization Curve:

1) The adhesive was digitally printed by Atlas Poly system over a reference substrate (white cotton fabric as of the final product) with incremented ink volumes over the printed area with gaps of 5% each time (0%, 5%, 10%, . . . , 100%), so a 5% gradient of well-marked adhesive densities was created over the substrate with the same printed attributes as of the final product:
   a. 25% immobilization fluid on the substrate
   b. Ink resolution of 600×800 DPI;
   c. inkjet immobilization resolution of 600×800 DPI with 100% coverage factor;
   d. Pre-curing of the printed layer was done for 2 minutes in a hot air dryer in 110° C.;
2) Repeat step (1) two more times to create three layers of adhesive as required for the specific flocks in use.
3) The entire printed area was flocked by a flocking sheet and pressed by heat press system for 30 seconds; the excessive flocks were cleared from the substrate by air pressure;
4) The flocked substrate was dried for final curing on a hot air dryer in 110° C. for 10 minutes; the end result was a flocked surface with 0-100% gradient flocking areas.
5) The flock amount/grey values in each flocked section were measured by L value using an "Exact x-rite Pantone" color determination device, so for each coverage there was an actual L value it represents;
6) A mathematical linearization model was calculated using the measured data to enable the prediction of the actual adhesive density for each flocking attributes (greyscale, velvet hand feel).

Using the data from the linearization curve procedure the range of possible L values that are achievable are known, and so is the amount of adhesive needed for each L value. With this data, equal steps of L values are defined to afford a linear gradient of flock (greyscale) and match the correct amount of adhesive for each value.

Figure 4:
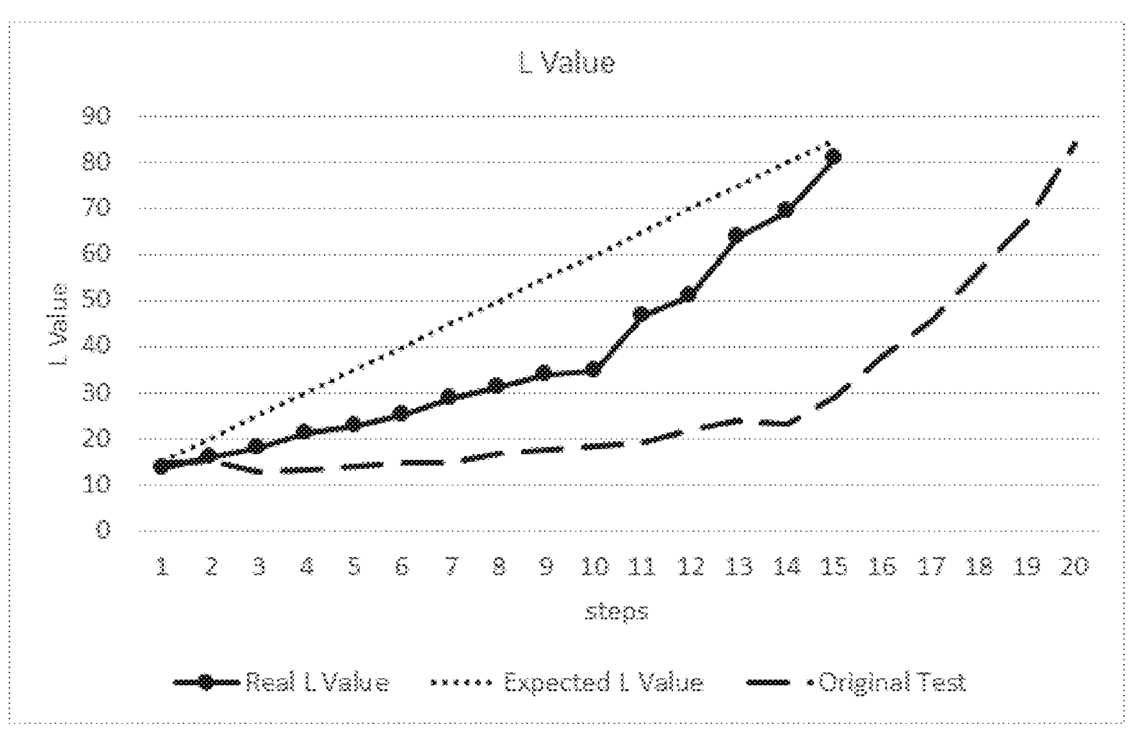
FIG. 4 presents the calibration curves obtained during the linearization procedure using the above-mentioned machine, substrate, adhesive and flocking parameters, wherein the solid line represents the ideal L value (lightness or color intensity), the dotted line represents the resulting L values before applying the linearization curve, and the double line represents the corrected L value after applying the linearization curve.

FIG. 4 presents the calibration curves obtained during the linearization procedure using the above-mentioned machine, substrate, adhesive and flocking parameters, wherein the solid line represents the ideal L value (color intensity), the dotted line represents the resulting L values before applying the linearization curve, and the double line represents the corrected L value after applying the linearization curve The linearization curve obtained as described hereinabove, was implemented to print the image of a cougar, presented in FIG. 5.

Stage 2—Greyscale Flock Image Creation Process:

1. Create printing file from the image and processing it with Kornit's RIP engine, using the flocking linearization curve created with the specific setting;
2. Place satin cotton substrate on an Atlas Poly pallet;
3. Spray 25% of immobilization composition over the printed area;
4. Print the image using Kornit's Olympia ink, by the white channels of the printer with resolution of 600×800 DPI;
5. Repeat stages 3-4 for two additional layers;
6. Perform pre-cure in a hot air dryer for 2 minutes in 110 C;
7. Cover the printed area with black 0.5 mm flock transfer sheet and press it by heat press for 30 sec in 160 C and 50 PSI;
8. Perform final cure in a hot air dryer for 10 minutes in 110 C;
9. Wait to cool down and remove flock sheet and excessive fibers.

Table 1 presents some of the parameters of the process described hereinabove.

TABLE 1

| Flock fibers | White ink resolution | Colors ink resolution | Ink Drop volume | # of adhesive layers | Pre-cure + Final curing |
|---|---|---|---|---|---|
| Polyamide 1.7 dtex 0.5 mm | 600 * 600 DPI | 600* 900 DPI | 60 pL | 2-3 | 110° C. 10 min, followed by Then 160° C. for 10 min |
| Viscose 3.3 dtex 1 mm | 800 * 800 DPI | 600* 900 DPI | 30 pL | 3-4 | 110° C. 10 min followed by 160° C. for 10 min |

Final Result:

The result of the process above (see, FIG. 5) is a white cotton fabric (or garment) with a specific image over it, covered with 0.5 mm black flock fibers with different densities with fluent greyscale tones. The appearance is of a high-resolution B&W greyscale image with a range of tones of grey and the hand-feel is soft and velvety throughout the image, with a more velvety feel in the denser areas.

Figure 5:
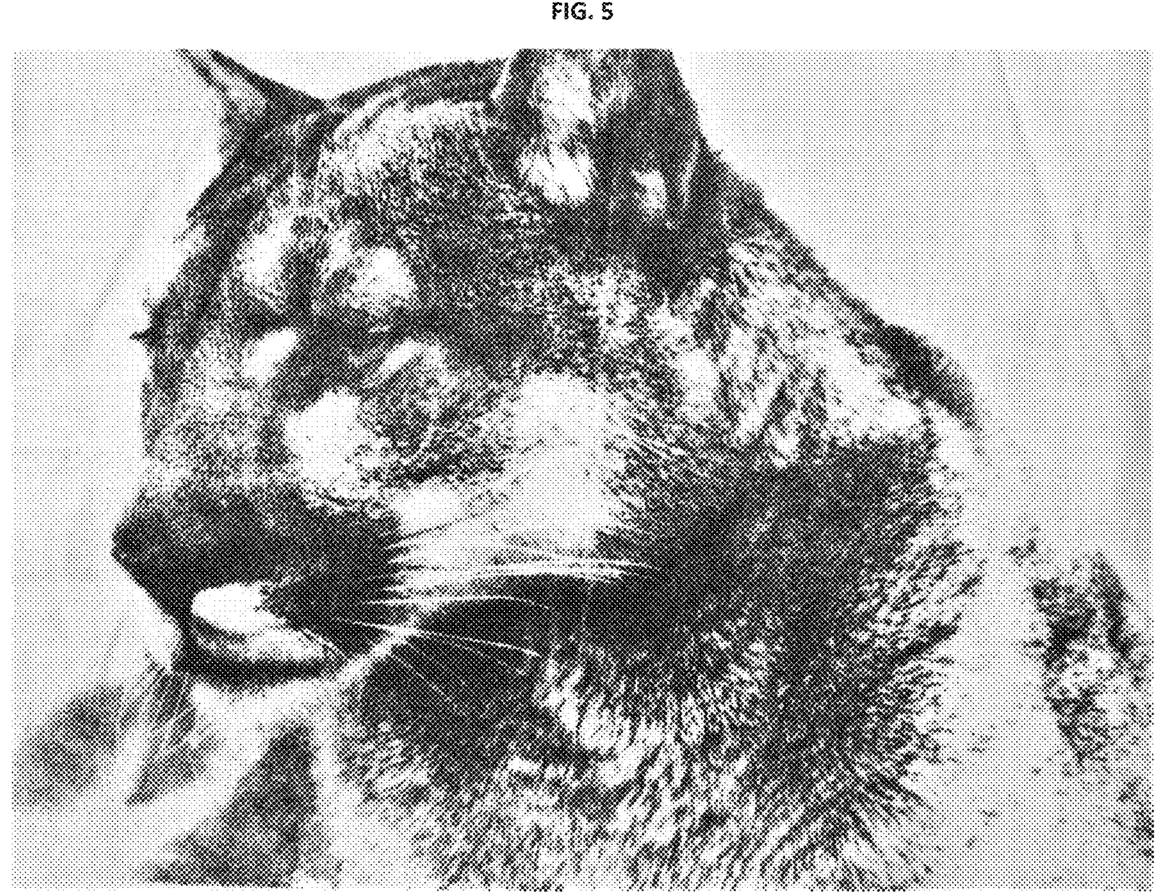
FIG. 5 is a photograph of a piece of cotton fabric and an image of a cougar printed thereon using an adhesive composition as a digital ink, and black flock fibers applied thereon to form a greyscale image exhibiting a range of flock intensities from black (dense, full coverage flock) to white (no flock).

FIG. 5 is a photograph of a piece of cotton fabric and an image of a cougar printed thereon using an adhesive composition as a digital ink, and black flock fibers applied thereon to form a greyscale image exhibiting a range of flock intensities from black (dense, full coverage flock) to white (no flock).

Example 2

Transparent Flocking Over a Printed Image on a White Fabric

Materials and Methods

- Printing Machine: Kornit Atlas Poly Max digital Direct to Garment (DTG) inkjet printer for textile;
- Substrate: Satin cotton fabric;
- Adhesive (ink) composition: Kornit's Neopigment™ Olympia white and colored (CMYKRG) inks;
- Resolution (white and color): 600×800 DPI;
- Number of ink/adhesive printhead channels: 4 (for white), 2 (per color);
- Number of ink/adhesive layers: up to 3;
- Immobilization type by inkjet: Kornit Q.fix poly;
- Immobilization amount: 100% max coverage;
- Ink/adhesive drop volume: white—60 pL (double drop), C—30 pL (single drop);
- Immobilization amount by spray: 25%;
- Flock type: Flock sheets by "Eptainks" viscose 0.5 mm thickness black;
- Press parameters: 160° C., 30 Sec, 50 psi;
- Dryer: Chiossei e Cavazzuti (conveyer) TP320;
- Pre-cure: 2 min, 110° C.;
- Final cure: 10 min, 110° C.
- A colorful image covered with flocks was digitally printed on the substrate as follows:

Stage 1—Linearization: Same Process as in Stage 1 of Example 1 Above With the Current Setting and Materials.

Stage 2—Background Flocked Image Creation Process:

1. Create printing file from the image processed by Kornit's RIP engine;
2. Place satin cotton substrate on an Atlas Poly pallet;
3. Spray 25% Immobilization composition over the printed area to reduce mobilization of the ink;
4. Print the background image using Kornit's Olympia inks, by the color channels of the printer with resolution of 600×800 DPI;
5. Repeat steps 3-4 for two additional layers;
6. Perform pre-cure in a hot air dryer for 2 minutes in 110° C.;
7. Cover the printed area with transparent flock transfer sheet and press it by heat press for 30 sec in 160° C. and 50 PSI;
8. Perform final cure in a hot air dryer for 10 minutes in 110° C.; and
9. Wait to cool down and remove flock sheet and excessive fibers.

Final Result:

The result of the process above is a white cotton fabric (or garment) with a specific image over it, covered with 0.5 mm transparent flock fibers with different densities with fluent greyscale tones. The appearance is of a color high resolution image and the hand-feel is soft and velvety throughout the image, with a more velvety feel in the denser areas.

Example 3

Two-Color Flocking of an Image on a White Fabric

For another proof of concept of some aspects of the present disclosure was carried out as described below.

Materials and Methods

- Printing Machine: Kornit Atlas digital Direct to Garment (DTG) inkjet printer for textile;
- Substrate: Satin cotton fabric;
- Adhesive (ink) composition: Kornit's Neopigment™ Olympia white ink;
- Resolution: 600×800 DPI;
- Printing Machine: Kornit Atlas Poly Max;
- Number of ink/adhesive printhead channels: 4;
- Number of ink/adhesive layers: up to 3;
- Immobilization type by inkjet: Kornit Q.fix poly;
- Immobilization amount: 100% max coverage;
- Ink/adhesive drop volume: 60 pL (double drop);
- Immobilization amount by spray: 25%;
- Flock type: Flock sheets by "Eptainks" viscose 0.5 mm thickness in various different colors;
- Press parameters: 160 C°, 30 Sec, 50 psi;
- Dryer: Chiossei e Cavazzuti (conveyer) TP320;
- Pre-cure: 2 min, 110° C.; and
- Final cure: 10 min, 110° C.
- A colored image made of flocks was formed on the substrate as follows:

Stage 1—Linearization:

The same procedure as in Example 1 hereinabove was used in this example, except for using different colored flocks each time to obtain linearization models for each color.

The range of possible L values that were achievable were known using the data from the linearization procedure, as well as the amount of adhesive needed for each L value for each color. The linearization curve data enabled the definition of the equal steps of L values (to afford a linear gradient of flock) and match the correct amount of adhesive for each value.

Stage 2—Two-Color Flock Image Creation Process:

1. Create printing file (RIP data) for each flock color using the image and processed by Kornit's RIP engine, using the flocking linearization curve created with the specific setting;
2. Place satin cotton substrate on the Atlas Poly pallet;
3. Spray 25% of immobilization composition over the printed area;
4. Print the part of the image aimed to be covered by flock color #1 using Kornit's Olympia ink in the white channels of the printer with resolution of 600×800 DPI; Note: in this stage a gradient of the adhesive is also performed to achieve full "greyscale" colorization of each color in use, as in Example 1.
5. Repeat steps 3-4 for two additional layers;
6. Perform pre-cure in a hot air dryer for 2 minutes in 110° C.;
7. Cover the printed area with flock color #1 (0.5 mm flock transfer sheet) and press it by heat press for 30 sec in 160° C. and 50 PSI;
8. Repeat step 4 with the part of the image aimed to be covered by flock color #2 (note: the accurate coverage of an exact area is possible by the digital ink deposition with high resolution and fine drops);

9. Repeat step 5-7 with flock color #2 flocking sheet; the flocks shall adhere only to the second coverage area;

10. Perform final cure in a hot air dryer for 10 minutes in 110° C.;

11. Wait to cool down and remove flock sheet and excessive fibers.

Final Result:

The result of the process above is a cotton fabric (or garment) with a specific image over it made of flock fibers. The colored areas of the image are covered with two (or more) colors of 0.5 mm flock fibers with different densities and fluent greyscale tones. The appearance is of a high-resolution colored image (with different tones) and the hand-feel is soft and velvety throughout the image, with more velvety feel in the denser areas of each color.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A process of forming an image in flock, comprising:

digitally printing a first adhesive composition directly on a surface of a substrate at a range of DPI values according to a first set of raster image processor (RIP) commands;

flocking said surface using a first flock material; and curing the image.

2. The process of claim 1, further comprising, prior to said flocking, pre-curing and/or partially drying said adhesive composition.

3. The process of claim 1, further comprising, prior to said curing, digitally printing said first adhesive composition or a second adhesive composition directly on a surface of a substrate at a range of DPI values according to said first set of RIP commands or a second set of RIP commands, and flocking said surface using said first flock material and/or a second flock material, said second adhesive composition is different than said first adhesive composition, said second set of RIP commands is different than said first set of RIP commands, and said second flock material is different than said first flock material.

4. The process of claim 1, further comprising digitally printing a colored ink composition prior to, or subsequent to any one of said digitally printing a first adhesive composition and/or said flocking said surface using a first flock material.

5. The process of claim 1, further comprising, prior to said digitally printing, obtaining a linearization curve, and implementing said linearization curve to said RIP commands.

6. A method for obtaining a linearization curve for digital flocking, comprising:

forming a pattern using a given adhesive composition on a given substrate by a given printing machine, said pattern is afforded by digitally printing said adhesive composition in a gradient of original DPI values ranging from no surface coverage to maximal surface coverage;

flocking said pattern with a given flock material by a given flocking method;

curing said flocked image using a given curing conditions method to thereby obtain a flocked greyscale image;

measuring a flock intensity of said flocked greyscale image at a plurality of positions along said greyscale, thereby obtaining the linearization curve that correlates a DPI value on a range of DPI values to a flock intensity value on a range of flock intensity values.

7. The method of claim 6, wherein the linearization curve is unique for a set of said given adhesive composition, said given printing machine, said given flock material, said given flocking method, and said given curing conditions.

8. The method of claim 6, wherein the linearization curve is implemented in a set of RIP commands to modify said original DPI values, thereby obtaining modified DPI values for a digital flocking process.

9. An image comprising a substrate and flock fibers disposed on a surface of the substrate, wherein the image comprises different regions having different densities of flock fibers such that the image is characterized by more than one discernable flock intensity across the image, the image is afforded by a process that comprises digitally printing a first adhesive composition directly on said surface of said substrate at a range of DPI values according to a first set of raster image processor (RIP) commands.

10. The image of claim 9, wherein said different regions define a greyscale image exhibiting a range of flock intensities from a region having a greater density of flock fibers and a darker appearance to a region having a lesser density of flock fibers and a lighter appearance.

11. An image comprising regions, characterized by more than one flock intensity, afforded by a process that comprises digitally printing a first adhesive composition directly on a surface of a substrate at a range of DPI values according to a first set of raster image processor (RIP) commands;

flocking said surface using a first flock material; and curing the image.

* * * * *